США012085147B2

(12) United States Patent
Hermey et al.

(10) Patent No.: US 12,085,147 B2
(45) Date of Patent: Sep. 10, 2024

(54) LINE GUIDE WITH SUPPORT CHAIN FOR CLEAN ROOM APPLICATIONS AND SUPPORT CHAIN THEREOF

(71) Applicant: IGUS GMBH, Cologne (DE)

(72) Inventors: Andreas Hermey, Hennef (DE); Dominik Barten, Meckenheim (DE)

(73) Assignee: IGUS GMBH, Cologne (DE)

( * ) Notice: Subject to any disclaimer, the term of this patent is extended or adjusted under 35 U.S.C. 154(b) by 326 days.

(21) Appl. No.: 17/596,468

(22) PCT Filed: Jun. 10, 2020

(86) PCT No.: PCT/EP2020/066139
§ 371 (c)(1),
(2) Date: Dec. 10, 2021

(87) PCT Pub. No.: WO2020/249642
PCT Pub. Date: Dec. 17, 2020

(65) Prior Publication Data
US 2022/0268337 A1    Aug. 25, 2022

(30) Foreign Application Priority Data
Jun. 11, 2019  (DE) .................... 20 2019 103 269.3

(51) Int. Cl.
*F16G 13/16*       (2006.01)
*F16L 3/015*       (2006.01)
(Continued)

(52) U.S. Cl.
CPC .............. *F16G 13/16* (2013.01); *F16L 3/015* (2013.01)

(58) Field of Classification Search
CPC ....... F16G 13/16; F16L 3/015; H02G 3/0487; H02G 11/006
See application file for complete search history.

(56) References Cited

U.S. PATENT DOCUMENTS

| 10,290,394 B2 | 5/2019 | Tetsuka et al. |
| 2008/0217487 A1* | 9/2008 | O'Rourke ............. H02G 11/00 248/65 |

(Continued)

FOREIGN PATENT DOCUMENTS

| CN | 107429795 | 12/2017 |
| DE | 9203633 | 5/1992 |

(Continued)

OTHER PUBLICATIONS

English translate (DE102006060252A1), retrieved date Dec. 24, 2023.*

(Continued)

*Primary Examiner* — Mohammed S. Alawadi
(74) *Attorney, Agent, or Firm* — Grossman, Tucker, Perreault & Pfleger, PLLC

(57) ABSTRACT

A cable run arrangement for clean room applications, which is movable forming two strands and a deflecting bend. The cable run arrangement comprises: a flexible sleeve having a plurality of receiving channels, arranged alongside one another, for supply lines, and at least one support chain, which cooperates with the sleeve in order to support at least one associated receiving channel in a stretched position. According to the invention, the support chain forms a support surface, the width of which is greater than the corresponding dimension of the free cross section of the associated receiving channel. The invention also relates to a support chain per se, which forms a support surface, the width of which amounts to at least three times the distance of the support surface from the opposite side of the support chain.

19 Claims, 2 Drawing Sheets

(51) Int. Cl.
*H02G 3/04* (2006.01)
*H02G 11/00* (2006.01)

(56) References Cited

U.S. PATENT DOCUMENTS

| | | | | |
|---|---|---|---|---|
| 2012/0187271 A1* | 7/2012 | Komiya | ............... | F16L 3/015 |
| | | | | 248/634 |
| 2012/0267164 A1* | 10/2012 | Reuss | ............... | H02G 3/0487 |
| | | | | 248/74.2 |
| 2022/0268337 A1* | 8/2022 | Hermey | ............... | F16G 13/16 |

FOREIGN PATENT DOCUMENTS

| | | | | |
|---|---|---|---|---|
| DE | 102006060252 | | 7/2007 | |
| DE | 102006060252 A1 * | | 7/2007 | ............ F16G 13/16 |
| DE | 102007005059 | | 7/2008 | |
| DE | 102015100003 | | 7/2016 | |
| DE | 112016002597 | | 5/2018 | |
| EP | 1520656 | | 4/2005 | |
| JP | 2012-149752 | | 8/2012 | |
| KR | 20120060528 A * | | 6/2012 | |
| KR | 10-2013-0073056 | | 7/2013 | |
| WO | 2005071284 | | 8/2005 | |
| WO | 2011016066 | | 2/2011 | |

OTHER PUBLICATIONS

English translate (KR20120060528A), retrieved date Dec. 24, 2023.*
International Search Report from corresponding PCT Appln. No. PCT/EP2020/066139, dated Sep. 15, 2020.
Office Action from related Chinese Appln. No. 202080050056.1, dated Nov. 9, 2023.
Office Action from related Chinese Appln. No. 202137056146, dated Dec. 13, 2023.
Office Action from related Japanese Appln. No. 2021-573223, dated Mar. 12, 2024. English translation attached.

* cited by examiner

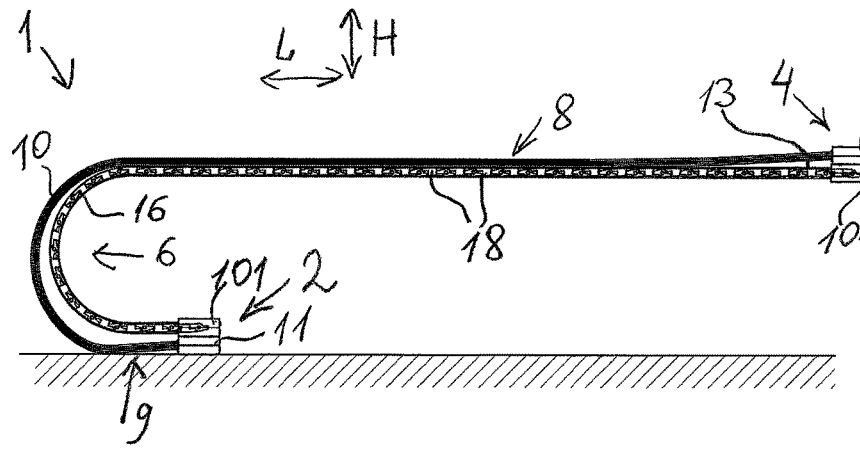
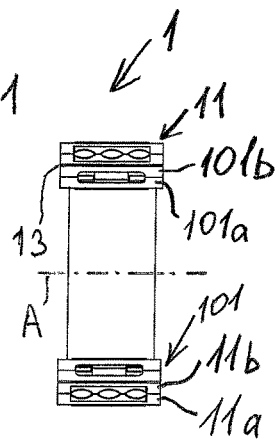
FIG.1A  FIG.1B
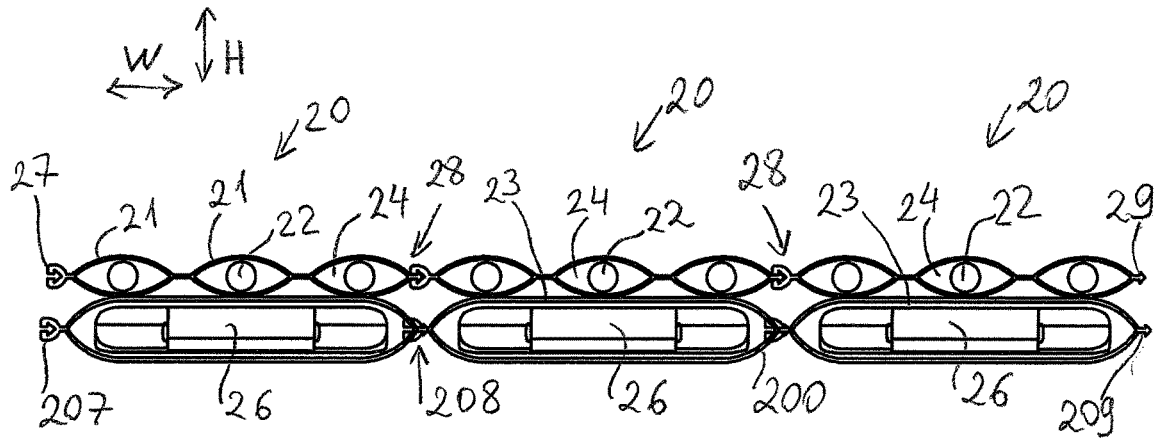
FIG.2
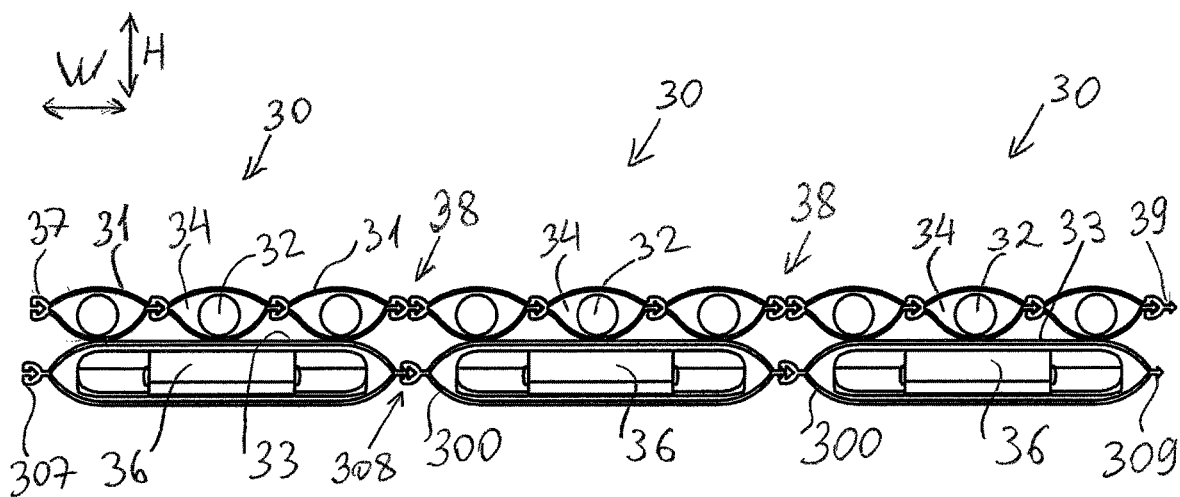
FIG.3

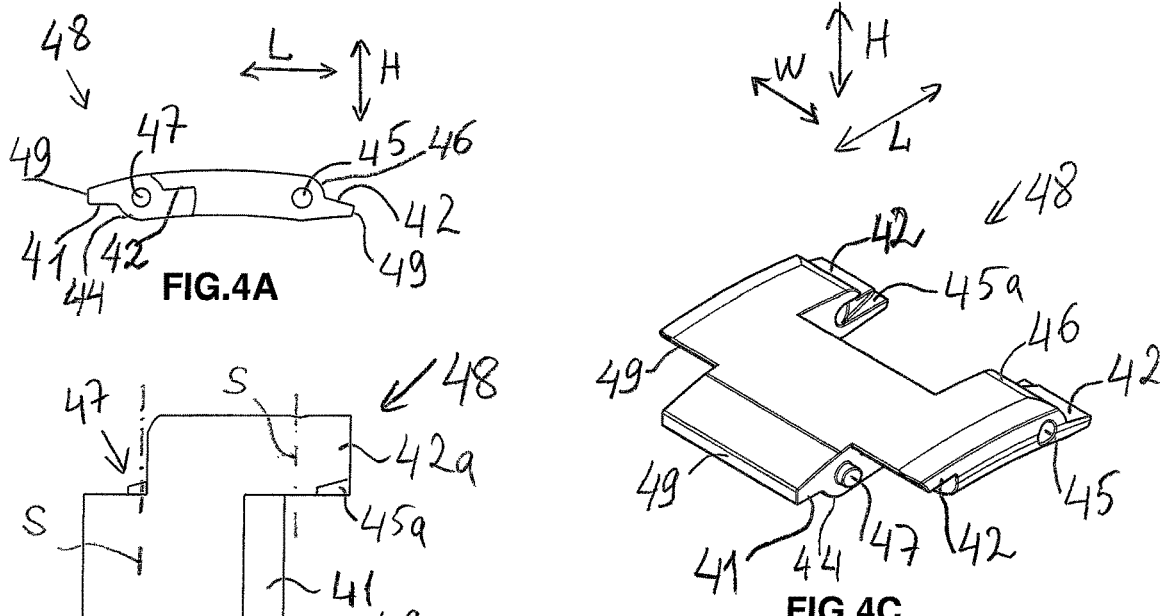

LINE GUIDE WITH SUPPORT CHAIN FOR CLEAN ROOM APPLICATIONS AND SUPPORT CHAIN THEREOF

FIELD

The invention concerns a line guide arrangement, in particular for clean room applications, for protected dynamic or active guidance of supply lines like cables, hoses or the like between two connecting locations moveable relative to each other, wherein the line guide arrangement is reciprocatingly displaceable with the formation of two runs and a direction-changing arc between the runs. The line guide arrangement is disposed within the runs in a position of being substantially straight with respect to its longitudinal direction and within the direction-changing arc in a curved direction-changing position. The direction-changing arc is typically curved in an approximately U-shaped configuration about a direction-changing axis extending transversely relative to the longitudinal direction L, wherein the direction-changing axis extends parallel to the width direction of the line guide arrangement.

BACKGROUND

A known line guide arrangement of that kind includes a flexible enclosure for enclosing supply lines, comprising a plurality of mutually juxtaposed receiving passages for at least one respective supply line, the receiving passages extending in the longitudinal direction. There is provided at least one support chain extended in the longitudinal direction L for stabilisation or for greater self-supporting lengths of the run which is not being supported. It can be produced in particular from individual chain links and cooperates with the enclosure for supporting at least one and in most cases a plurality of associated receiving passages in the straight position, in particular of the self-supporting run.

Such a line guide arrangement is known for example from DE 10 2012 100 359 A1, here with two support chains laterally externally in the enclosure. Each of the support chains in accordance with DE 10 2012 100 359 A1 is received in a respective outer receiving passage at one of the two narrow sides of the enclosure. The number of receiving passages which can be used between the support chains for the supply lines is limited in that case as excessive sagging of the central part (in relation to width) of the enclosure is to be prevented or has to be prevented.

The option of enlargement in the direction of the width is not readily afforded here so that in many cases a multi-layer arrangement, often with more than two layers, is inevitable. That in turn is prejudicial to avoiding unwanted abrasive wear particles between individual layers.

SUMMARY

Accordingly, an object of the present invention is to propose a line guide arrangement in particular for clean room applications, which can guide a plurality of supply lines and which can be relatively easily enlarged, in particular in the direction of the width, or which can be embodied with a smaller number of layers.

In a line guide arrangement the object is already attained in that the proposed support chain forms a support surface, the width of which is greater than the corresponding dimension of the free cross-section of the associated receiving passage.

In that arrangement, with respect to the height direction H extending transversely to the longitudinal direction L, the support chain can extend above and/or below the associated receiving passage of the enclosure. The support chain can for example be arranged in particular on the central longitudinal sectional plane of the supported receiving passage or so that that longitudinal sectional plane passes through the support chain.

The dimension of the support chain in the width direction W, that is to say in the direction extending transversely relative to the longitudinal direction L and parallel to the direction-changing axis A (which in the present case is referred to as the width of the support chain) is in this case greater than the corresponding dimension of the associated receiving passage, that is to say the width thereof considered in the same direction. Accordingly, the support chain can support at least one associated receiving passage, but in particular at least two or more receiving passages, to prevent sagging in the straight position.

In other words, the proposed support chain, in cross-section perpendicularly to the longitudinal direction L, is at least wider than the associated receiving passage for a supply line that the support chain is intended to support in operation. According to the invention therefore the support chain is of a markedly larger dimension in the width direction W, than in the state of the art.

Accordingly, depending on the respectively selected width, the support chain can form a stable support (even indirectly by way of further intermediate layers like enclosures) for a plurality of receiving passages or supply lines.

Independently thereof the invention also concerns a support chain.

The support chain is reciprocatingly displaceable with the formation of two runs and a direction-changing arc between the runs and within the runs extends in a position of being substantially straight with respect to its longitudinal direction L, optionally with a prestressing, and within the direction-changing arc extends in a direction-changing position or an arcuate configuration about the direction-changing axis.

For that purpose, when in the form of a link chain, the support chain either includes similar chain links or for example, in the form of a belt chain or the like, it includes similar segments (hereinafter also referred to as chain links or viewed synonymously), wherein each two successive chain links are pivotably connected together, in particular about a pivot axis parallel to the direction-changing axis A.

According to the invention the support chain forms a support surface, the width of which is larger by a factor >3 than the spacing of the support surface from the opposite side of the support chain or the run (considered in cross-section perpendicularly to the longitudinal direction L).

In other words, the width of the support surface, that is to say its dimension in the width direction W transversely to the longitudinal direction, is larger at least by a factor of 3 than the dimension of a chain link in the height direction perpendicularly to the longitudinal direction L and the width direction W. The chain links are thus of a comparatively flat or plate-like structural configuration with a structural height (thickness) markedly less than the width of the support surface.

In that respect, in relation to a chain link being considered, the effective width or total width of the support surface can in particular be of a greater size than the length of the support surface (dimension in the longitudinal direction).

By virtue of a suitable width of the support surface this arrangement results in relatively stable support for a plurality of mutually juxtaposed receiving passages, with at the same time a comparatively low weight for the support chain and/or a small radius in the direction-changing arc. On the other hand corresponding dimensioning of the chain links, with a comparatively large width, also permits improved lateral stability, that is to say the support chain can compensate for or carry even relatively great transverse forces transversely relative to the longitudinal direction. That also reduces unwanted abrasion in relation to uses involving a transverse movement.

Typically the support chain has first abutment surfaces which are adapted to bear against each other in the straight position in order to counteract sag of the support chain in the straight position, and second abutment surfaces which are adapted to bear against each other in the direction-changing position in order to limit a minimum direction-changing radius of the direction-changing arc of the support chain. The first and the second abutment surfaces are respectively of a dimension in the longitudinal direction L and a dimension in a width direction W along the direction-changing axis A.

In a preferred embodiment the dimension of the respective first and/or second abutment surface in the width direction W is greater than its dimension in the longitudinal direction L.

The chain links (or segments) of the support chain can be connected to each other pivotably relative to each other, in particular pivotably about a defined pivot axis. The pivot axis in the case for example of a connection comprising a bolt received in a receiving mounting typically extends parallel to the direction-changing axis, in particular along the axis of symmetry of the bolt and the mounting (parallel to the width direction W). Other kinds of pivotable connection, for example with a flexible hinge connector, are also possible.

The first and the second abutment surfaces can thus limit the pivotal movement about the pivot axis in one direction or in the other opposite pivotal direction.

To reduce the loading each chain link can have two or more first abutment surfaces for bearing against the two adjoining chain links to which it is connected within the chain. Correspondingly each chain link can have two or more second abutment surfaces for bearing against the two adjoining chain links which follow the chain link being considered, within the chain. Each first or second abutment surface does not necessarily have to be flat or continuous and can for example include a plurality of surface portions spaced from each other in the width direction.

The width of the support surface in turn is preferably greater than the total of the corresponding dimensions (width of the free cross-section) of at least two associated receiving passages, particularly preferably at least three associated receiving passages, so that the support chain can support the at least two or three associated receiving passages to prevent sag in the straight position without the enclosure sagging or being self-supporting. The dimension of the support surface in the width direction W in cross-section perpendicularly to the longitudinal direction can thus preferably be greater than the total of the corresponding dimensions of the free cross-section of at least two associated receiving passages (in cross-section perpendicularly to the longitudinal direction).

For the purposes of simplification of production and assembly the support chain is preferably assembled from individual chain links which in particular are structurally identical. The chain links can be produced separately individually, preferably from plastic, in particular using an injection moulding method, and can be pivotably connected together to form a chain, for example by connection or production of a hinge connection between the chain links.

The support chain preferably has a large number of chain links which are each in one piece and are in the form of a full solid body or are monolithic. Preferably each chain link of the support chain is produced in the form of a solid body, in particular of plastic. The advantage of this structure is that the chain links are flexurally stiff and robust but nonetheless remain simple and easy to manufacture. The low weight of the line guide arrangement overall is advantageous for relatively great self-supporting lengths of the upper run.

The support chain preferably has a large number of chain links which are respectively of mirror-image symmetrical configuration relative to a longitudinal central plane (perpendicular to the width direction). Preferably each chain link of the support chain is of a mirror-image symmetrical configuration with respect to the longitudinal central plane.

The support chain preferably has a large number of chain links which are each of a plate-shaped configuration.

Additionally or alternatively the dimension of the chain link in the width direction W can be at least five times (factor of >5), preferably by a factor of >8, larger than its dimension in the height direction H perpendicularly to the width direction W and perpendicularly to the longitudinal direction L.

Preferably all chain links of the support chain involve corresponding size ratios. Thus the support chain can have a wide support surface which remains the same for a plurality of supply lines, while at the same time being low in inherent weight.

In a preferred embodiment in the straight position of the support chain a surface region of a chain link, that is opposite to the second abutment surface, lies flush or in alignment with the surface of the next adjacent chain link so that this results in a transition which is as stepless and/or seamless as possible. Correspondingly in the direction-changing position of the support chain a further surface region of the support chain, that is opposite to the first abutment surfaces, can lie flush or aligned in the arc direction with the surface of the next adjacent chain link. In that way abrasion-generating protruding edges are avoided or clamping of the enclosure which is supported by the support chain and/or also an additional chain enclosure with which the chain can be enclosed is prevented in that way.

Furthermore the support surface of a chain link is preferably of a width which is greater than the chain pitch of the support chain or than the spacing between two successive pivot axes. In spite of a wide chain it is possible in that way to achieve relatively small direction-changing radii, that is to say this permits a small overall height in respect of the line guide arrangement. In addition in that way it is possible to reduce the polygon effect or the support chain can form a direction-changing arc which is as round as possible or which is in the form of a segment of a circle. That also reduces loading on the supported lines and unnecessary abrasion, in particular in respect of the enclosure being supported.

The support chain can preferably but not necessarily be in the form of a link chain. In a preferred configuration the chain links of the support chain are pivotably connected together by receiving mounting-bolt connections. In that case preferably insertion chamfers are provided on the bolts and insertion grooves are provided on the cooperating mountings, for assembling or connecting the chain links together, in particular in the longitudinal direction L. Assembly or mounting of the support chain can thereby be carried out manually and without a special tool.

Preferably the support chain has a large number of chain links which are respectively so designed that the dimension of the respective chain link in the width direction W is greater than its dimension in the longitudinal direction L. Preferably in that case each chain link of the support chain is of a corresponding configuration or size. Special end members can be provided at the end for fixing the chain links to the connecting points, the structure of which members can differ.

Each support chain is preferably enclosed with its own flexible chain enclosure, in particular of flexurally elastic plastic, which is provided or produced separately from the enclosure of the supply lines. That can prevent abrasion particles being given off by the support chain itself.

Preferably the enclosure for the lines and/or the chain enclosure is of a belt-like or hose-like configuration and has at least one functional region extended in the longitudinal direction L, at least at one of its narrow sides or longitudinal sides, in particular for dust-tightly closing an opened state of the enclosure or the chain enclosure, in which a supply line or a support chain respectively can be inserted into or removed from a receiving passage of the enclosure or the chain enclosure transversely relative to the longitudinal direction L, and on the other hand for opening the enclosure as required, that is to say for transferring the enclosure or chain enclosure into the opened state again, for example to replace a defective line. The functional region can include in particular two cooperating profile members of a closure which in particular can be in the form of positively locking and/or force-locking engagement profiles.

Additionally or alternatively the functional region can have at least one fixing profile for connection of the enclosure and/or the chain enclosure to a further enclosure and/or the chain enclosure. That is advantageous in terms of expandability of the line guide arrangement which in that way can be particularly easily enlarged in the width direction W.

The enclosure for the lines and also the chain enclosure, in particular as distinguished from the chain links of the support chain, can be manufactured from a flexurally elastic plastic. The length-related flexural stiffness of the individual chain links in that case can be for example higher than the length-related flexural stiffness of the enclosure. The modulus of elasticity of the material of the chain links is preferably higher than that of the material of the enclosure or a stiffer or harder material is preferably used for the chain links.

Preferably the support chain has a large number of chain links which respectively have guide surfaces which are convexly rounded around the bolt and around the mounting respectively and which adjoin the first abutment surfaces or the second abutment surfaces respectively in the longitudinal direction L in order to form a movement gap which is as small as possible with an end face of a further pivotably connected chain link to allow for movement. Optionally both surfaces upon pivotal movement can also form a kind of guide, for example for additional transverse stabilisation. In that case the end faces of the chain links can have the convex or concave regions which are matched to the convexly rounded guide surfaces.

BRIEF DESCRIPTION OF THE DRAWINGS

Further details, features and advantages of the invention will be apparent, without limitation on the generality of the foregoing, from the detailed description hereinafter of preferred embodiments by way of example with reference to the accompanying diagrammatic drawings in which:

FIG. 1A shows a side view of an embodiment of the line guide arrangement,

FIG. 1B shows a front view of the line guide arrangement of FIG. 1A,

FIG. 2 shows a front view of a partial region of an embodiment of the line guide arrangement, FIG. 3 shows a front view of a partial region of a further embodiment of the line guide arrangement, FIG. 4A shows a side view of an embodiment of a chain link of the support chain, FIG. 4B shows a plan view of the chain link of FIG. 4A, FIG. 4C shows a perspective view of the chain link of FIG. 4A, FIG. 5A shows a partial region of the support chain in the straight position, and FIG. 5B shows a partial region of the support chain in the direction-changing position.

DETAILED DESCRIPTION

FIGS. 1A and 1B show an embodiment of the line guide arrangement 1 which guides supply lines (not shown here) between a stationary connecting location 2 at a base and a moveable connecting location 4 at a typically linearly displaceable entrainment means (not shown). The supply lines can carry for example current, signals and/or operating media from a source at the base or at the connecting location 2 to a moveable part of a machine, to which the entrainment means is connected. FIG. 1A shows a snapshot of the line guide arrangement 1 with an upper run 8, a lower run 9 and a direction-changing arc 6, wherein the upper run 8 (at the right) is in a straight position and a further longitudinal portion of the line guide arrangement 1 is in a direction-changing position (at the left). In the direction-changing position the line guide arrangement 1 forms the direction-changing arc 6 with a predetermined bending or direction-changing radius about a notional direction-changing axis A. In operation the direction-changing arc 6 moves over a distance relative to the stationary connecting location 2 when the upper run 8 is displaced with the moveable connecting location 4.

The line guide arrangement 1 is suitable in particular for clean room applications or other areas of use in which abrasive wear dust and the liberation of particles is to be reduced or avoided. For that purpose the line guide arrangement 1 has an elongate, flexible and dust-tight enclosure 10 comprising soft-elastic plastic, which encloses the supply lines along their entire length between the connecting locations 2 and 4. In that connection the proposed enclosure 10 has a plurality of, that is to say at least two, receiving passages of a tubular configuration for guiding at least one respective supply line. The two ends of the enclosure 10 are dust-tightly closed, that is to say with clamping devices 11 as end connections. The enclosure 10 is overall hose-like and is sufficiently flexible inter alia by virtue of being of a suitable design configuration and/or by virtue of a suitable choice of material to allow reversibly flexible curvature of the direction-changing arc 6 with the application of a low level of force and to follow the travel movement of the moveable connecting location 4 with the least possible resistance. The enclosure 10 can be produced in particular by an extrusion method.

The line guide arrangement 1 further has a support chain 16 extending along the entire length of the line guide arrangement 1 from the connecting location 2 to the connecting location 4. In the illustrated example the support chain 16 is arranged beneath the enclosure 10 in the region of the upper run 8, at the inside of the direction-changing arc 6 and correspondingly above the enclosure 10 in the region of the lower run 9. The support chain 16 supports the enclosure 10, in particular against sag caused by the force of gravity in the straight position of the upper run 8 and also against buckling in the direction-changing position. For the first-mentioned purpose the support chain 16 forms a support surface 13 which here serves as a support the upper run 8. The support chain 16 is of a chain link-type structure and at the same time limits the minimum radius in the direction-changing arc 6. A chain link 18 is pivotably connected to the next chain links 18. The support chain 16 has its own associated dust-tight chain enclosure (see FIGS. 2 and 3).

FIGS. 1A and 1B show two terminal clamping devices 11 each having two clamping portions 11a, 11b, between which the enclosure 10 together with supply lines (not shown) guided therein is closed by extending around the end thereof and being dust-tight in the axial direction, for example by clamping screws. The clamping devices 11 can at the same time provide for strain relief for the lines (not shown) and can be of a per se known structural configuration, for example similar to the teaching of DE 10 2012 100 290 B4 that is incorporated here by reference.

FIGS. 1A and 1B further show two end clamping devices 101 each having two clamping portions 101a, 101b for the chain enclosure of the support chain 16.

FIGS. 2 and 3 show two different embodiments of the line guide arrangement 1 as a front view, with the longitudinal direction extending perpendicularly to the plane of the drawing. The clamping devices are not shown here. The two embodiments differ substantially by the configuration of the enclosures 20 and 30 respectively.

FIG. 2 shows a line guide arrangement 1 having three interconnected enclosures 20 which each have three receiving passages 24. In the present example all enclosures 20 for the lines are structurally identical. Each enclosure 20 is of a belt-like configuration and laterally at both narrow sides or longitudinal sides has a respective functional region 28 extending in the longitudinal direction L. One of the functional regions 28 has two cooperating closure profiles 29 of a closure for dust-tightly closing an opened state of the enclosure 20, in which a supply line 22 can be introduced into or removed from the receiving passages 24 of the enclosure transversely to the longitudinal direction L by way of an opening which is continuous in the longitudinal direction L between the closure profiles 29. In the opened state (not shown) of the enclosure 20 all receiving passages 24 are open in the example shown in FIG. 2. The enclosures 20 in FIG. 2 are each in one piece. It is also possible for those enclosures each to be of a two-part configuration, each comprising two pairs of closure profiles 29 at both narrow or longitudinal sides.

The functional regions 28 can also serve for connecting the enclosures 20 together, for example they may have fixing profiles 27 extending continuously in the longitudinal direction L to enlarge the line guide arrangement 1 in the width direction W. The functional region 28 of an enclosure 20 is suitable for cooperating with a further functional region 28 of a further enclosure 20 (and/or a chain enclosure, see hereinafter) by way of the fixing profiles 27 thereof in order to connect the two enclosures 20 together or to expand the number of useable receiving passages in the width direction.

Each of the enclosures 20 includes a plurality of enclosure units 21. Each enclosure unit 21 forms the wall of a receiving passage 24 for the protective guidance of a supply line 22 and is made from flexible soft-elastic plastic, in particular a thermoplastic, for example PE, PU, TPU, PTFE, PP or the like. The enclosure unit 21 is of a thin wall in relation to the cross-section of the receiving passage 24. Each receiving passage 24, over its length, is of a cross-section which the same throughout, perpendicularly to the longitudinal direction L. The enclosure unit 21 can be inexpensively produced in the form of an extrusion using a suitable plastic extrusion procedure and can be cut to a suitable length, for example from about 100 mm to about 1500 mm. The three enclosure units 21 shown in FIG. 2 can be connected together in material-bonded relationship so that together they form a one-piece enclosure. The enclosure however can also be produced in one piece. The receiving passages 24 of the flexible enclosure are spatially separated from each other so that no abrasion can occur between supply lines 22 guided in parallel therein. The enclosure 22 can also be of such a structure (not shown) that each receiving passage is individually accessible, for example if each enclosure unit 21 has an opening which is continuous in the longitudinal direction L, with a closure similar to the closure profiles 29.

The receiving passage 24 or 34 in FIG. 2 or FIG. 3 respectively is of an approximately elliptical shape in cross-section, similar here to an almond shape. Further cross-sectional shapes, for example oval, elongatedly round or circular are also possible.

Each of the interconnected enclosures 20 is supported by an associated support chain 26, that is to say in this example a support chain 26 forms a support surface 23 for an enclosure 20 or for three receiving passages 24. In the upper run 8 (see FIGS. 1A and 1B) the support chain 26 is arranged beneath the associated enclosure 20 in order to prevent gravity-induced sag or downward deflection of the enclosure 20 together with the lines guided therein. A plurality of receiving passages 24 are supported by the same support chain 26 because the latter is comparatively wide in cross-section, here wider than the cross-section of two receiving passages 24 in the associated enclosure 20 in total.

In the direction-changing arc 6 the support chain 26 again ensures that the bending radius or radius of the direction-changing arc is not less than a permissible minimum value so that the guided supply lines 22 cannot be buckled or kinked. The support chain 26 thus ensures the minimum bending radius or minimum direction-changing radius of the line guide arrangement 1 and has abutments suitable for that purpose for limiting the pivotal angle. In the lower run 9 the support chain 26 is correspondingly arranged beneath the associated enclosure 20. A reverse arrangement is also possible.

Abrasion wear can occur in operation depending on the respective material of the chain links 48. To minimise the liberation of abrasion particles into the surroundings of the support chain 16, 26, 36 the support chain 16, 26, 36 is provided with its own flexible chain enclosure 200, 300. The chain enclosure 200, 300 is made from a soft-elastic plastic similarly to the enclosure 20, 30 of the supply lines 22, 32 and has a receiving passage 204, 304 extending in the longitudinal direction L for the support chain 16, 26, 36. The width of the free cross-section of the receiving space or passage 204, 304 for the support chain 16, 26, 36, corresponding to the dimensioning of the support chain 16, 26, 36, is always greater than the corresponding dimension of the free cross-section of the associated receiving passage 24, 34 of the enclosure for the supply lines 22, 23. At a narrow or longitudinal side the chain enclosure 200 also has a functional region 208 which is extended in the longitudinal direction L and has two cooperating closure profiles 209 of a closure for dust-tightly closing an opened state of the chain enclosure 200. The functional region of the chain enclosure 200 is suitable for cooperating with a further functional region 208 of a further chain enclosure 200 in order to laterally connect the two chain enclosures 200 together. For that purpose the functional region 208 can have a fixing profile 211 extending continuously in the longitudinal direction L, for example the same fixing profile as the fixing profile 27 of the enclosure 20 for the supply lines 22. In that way, for example one or more enclosures 20 can additionally be provided for supply lines 22 between two laterally spaced support chains 26 at the same heightwise position. The line guide arrangement 1 can thus be enlarged in the width direction W.

FIGS. 2 and 3 show line guide arrangements which respectively have three enclosures 20, 30 for supply lines, each enclosure 20, 30 being supported by an associated support chain 26, 36. Alternatively it would also be possible to reduce the number of support chains 26, 36 by enclosures being connected in the lateral direction between two support chains in self-supporting relationship thereto.

FIG. 3 shows a further embodiment of a line guide arrangement 1 having three interconnected enclosures 30 which each have three receiving passages 34 for supply lines 32. The difference from the embodiment of FIG. 2 is that the enclosure 30 is composed of individual separate enclosure units 31. For that purpose each enclosure 30 has functional regions 39 along each receiving passage 34 so that on the one hand each receiving passage 34 can be individually opened and closed again and on the other hand the individual enclosure units 31 can be connected together and separated from each other again. That affords greater flexibility over the embodiment of FIG. 2 in particular in maintenance or for subsequent modifications to the line fitment. The support chain 36 in FIG. 3 is designed on the basis of the principle of the support chain in FIG. 2 and is also provided with its own chain enclosure 300.

The fixing profile 207, 307 of the chain enclosure 200, 300 allows enlargement of the chain enclosures 200, 300 in the width direction W or subsequent adaptation in respect of width with further enclosed support chains 26; 36 (see FIGS. 2 and 3) or with a separate support track or empty chain enclosures 200, 300 between two chain enclosures 200, 300 for the support of lines or enclosures 20; 30 disposed in the upper run above same. It is also possible to provide support chains 26; 36 of differing width.

FIGS. 4A-4C show an embodiment of a chain link 48 for a support chain 16, 26, 36 in detail. The chain link 48 is of a plate-shaped configuration. The dimensions in the longitudinal direction L and in the width direction W are in each case a multiple greater (here about eight or ten times) than its dimension in the height direction H (perpendicularly to the longitudinal direction L and the width direction W). All chain links 48 of the support chain 16, 26, 36 are preferably structurally identical. The chain link 48 is produced in one piece from strong or flexurally stiff plastic, for example from fibre-reinforced polyamide using an injection moulding process. In the illustrated embodiment the chain link 48 is in the form of a solid body or of a monolithic structure whereby the flexural stiffness of the chain link 48 and the support chain 16, 26, 36 generally is enhanced. The plastic material of the chain link 48 however is comparatively light.

The chain link 48 is of a mirror-image symmetrical configuration relative to its longitudinal central plane (see FIG. 4B) with the longitudinal direction L and the height direction H in that plane of symmetry.

The chain links 48 shown in FIG. 4A-4C are pivotably connected together by rotary hinges. A rotary hinge comprises two circular-cylindrical pins 47 of a chain link 48 which are respectively rotatably received in a circular-cylindrical receiving means 45 of a further next adjacent chain link 48. The pivot axis S corresponds to the cylinder axis of the pin 47 or the receiving means 45 respectively and extends parallel to the axis A of the direction-changing arc 6 (FIG. 1A). Each chain link 48 thus has two circular-cylindrical pins 47 and two circular-cylindrical receiving means 45, wherein the axis of symmetry of the pins 47 is spaced from the axis of symmetry of the receiving means 45 of the same chain link by the chain pitch in the longitudinal direction L. The dimension of the pin 47 in the direction of the axis of symmetry or the pivot axis S or in the width direction W is less than its diameter, which makes it easier to assemble the support chain 16, 26, 36. To connect a chain link 48 to a further chain link 48 the chain links 48 are fitted together in the longitudinal direction, in particular without using a tool or manually. To make it easier to press them into engagement the pins 47 each have an inclined insertion portion 47a, wherein the receiving means 45 each have an insertion groove 45a. The insertion groove 45a extends substantially parallel to the longitudinal direction L, that is to say in the direction of the pin 47 of that chain link 48. The pin 47 of a further chain link 48 is introduced along the insertion groove 45a of the first chain link 48 into the receiving means 45 of the first chain link 48.

For limiting its pivotal angle the chain link 48 has two first abutment surfaces 41 spaced from each other in the longitudinal direction L, for butting engagement in the straight position of the support chain (as for example in the upper run 8, see FIG. 1A), at the corresponding first abutment surfaces 41 of the previous and the next chain link 48 respectively. In addition, for limiting the pivotal angle in the other pivotal direction the chain link 48 has two second abutment surfaces 42 which are spaced from each other in the longitudinal direction L and which serve for butting engagement or contact in the direction-changing position of the support chain (like for example in the direction-changing arc 6, see FIG. 1A), at the corresponding second abutment surfaces 42 of the previous and the next chain link 48 respectively.

The dimension of the respective abutment surface 41 or 42 in the width direction W is greater than the dimension of that abutment surface 41 and 42 in the longitudinal direction L. In the illustrated example each of the first abutment surfaces 41 in the case of the chain link 48 is respectively of a one-piece or cohesive structure, wherein each second abutment surface 42 respectively includes two surface portions 42a, 42b which are spaced from each other in the width direction W, more specifically by the width of the first abutment surface 41. In the present case the expression the width of an abutment surface is used to denote the total of the width of the surface portions.

FIGS. 5A and 5B show a short portion of the support chain, here comprising only two pivotably interconnected chain links 48 as shown in FIGS. 4A-4C. The chain links 48 are connected together by a receiving means-pin connection, the pivot axis S corresponding to the axis of the pin 47 and the receiving means 45 respectively. In this example the support surface 43 is formed by the top side of the chain links 48, that in the direction-changing position (as shown in FIG. 5B) is at the outside with respect to the direction-changing axis A (see FIG. 1A). The width of the support surface 43 or the dimension thereof in the width direction W is markedly greater than the chain pitch, that is to say than the spacing in the longitudinal direction L between two successive pivot axes S.

The chain links 48 are of such a configuration that a surface region 48a of the one chain link 48, that is opposite the second abutment surfaces 42 in the height direction H, in the straight position of the support chain as shown in FIG. 5A, terminates flush or steplessly and with the smallest possible gap with the surface of the other next adjacent chain link 48 when the first abutment surfaces 41 of those two chain links 48 are in butting relationship. Correspondingly a further surface region 48b of the one chain link 48, that is opposite the first abutment surfaces 41 in the height direction H, more specifically in the direction-changing position of the support chain as shown in FIG. 5B, is flush or steplessly in alignment with the surface of the other next adjacent chain link 48 (when the first abutment surfaces 41 butt against each other). Thus in operation of the line guide arrangement 1 jamming and abrasion wear at projecting edges in respect of the enclosure of the supply lines 10, 20, 30 which are supported by the support chain 16, 26, 36 and also in respect of the chain enclosure 200, 300 is avoided.

Each chain link 48 has end faces 49 which respectively delimit the abutment surfaces 41, 42 of the chain link 48 in the lengthwise direction L in the direction of the next chain link. Upon pivotal movement of the chain links 48 relative to each other the end faces 49 of a chain link are guided past guide surfaces 44, 46 of the adjoining chain link 48 or extend past same with a gap which remains narrow. The first guide surfaces 44 adjoining the first abutment surfaces 41 in the longitudinal direction L are respectively convexly rounded around the pins 47 with a corresponding radius. The second guide surfaces 46 adjoining the second abutment surfaces 42 in the longitudinal direction L are respectively rounded convexly about the receiving means 45 with a corresponding radius. The end faces 49 opposite the guide surfaces 44 and 46 respectively can be of a correspondingly concave shape. To increase the transverse stability the guide surfaces 44, 46 can possibly cooperate with the opposite end faces 49 in the manner of a sliding guide configuration, however a friction-free design configuration is preferred, which allows the guide surfaces 44, 46 to come into contact with the opposite end faces 49 only in the event of a high level of transverse loading.

LIST OF REFERENCES

FIGS. 1A; 1B:
1 line guide arrangement
2 stationary connecting location
4 moveable connecting location
6 direction-changing arc
8 upper run
9 lower run
10 enclosure for supply lines
11 clamping device of the enclosure for supply lines
11a, 11b clamping portions
13 support surface
16 support chain
18 chain link
101 clamping device of the chain enclosure
101a, 101b clamping portions
L longitudinal direction
H height direction
FIG. 2; 3:
20; 30 enclosure for supply lines
21; 31 enclosure unit of the enclosure
22; 32 supply line
23; 33 support surface
24; 34 receiving passage for supply line
26; 36 support chain
27; 37 fixing profile of the enclosure for supply lines
28; 38 functional region of the enclosure for supply lines
29; 39 closure profile of the enclosure for supply lines
200; 300 chain enclosure
204; 304 receiving passage for support chain
207; 307 fixing profile of the chain enclosure
208; 308 functional region of the chain enclosure
209; 309 closure profile of the chain enclosure
W width direction
H height direction
FIGS. 4A, 4B, 4C; FIGS. 5A, 5B;
41 first abutment surface
42 second abutment surface
42a, 42b surface portions of the second abutment surface
43 support surface
44, 46 guide surface of a chain link
45 receiving means
45a insertion groove
47 pin
47a inclined insertion portion
48 chain link
49 end face of a chain link
48a surface region opposite the second abutment surfaces
48b surface region opposite the first abutment surfaces
A direction-changing axis
L longitudinal direction
W width direction
H height direction
S pivot axis

What is claimed is:

1. A line guide arrangement for clean room applications, to protect guidance of one or more supply lines between two connecting locations, of which at least one of the two connecting locations is moveable relative to another one of the two connecting locations, wherein the line guide arrangement is reciprocatingly displaceable with a formation of two runs and a direction-changing arc between the two runs, wherein the line guide arrangement within the two runs is in a straight position with respect to a longitudinal direction and is in a curved direction-changing position within the direction-changing arc, the line guide arrangement further comprising:

a flexible enclosure to enclose the one or more supply lines, the enclosure having a plurality of mutually juxtaposed receiving passages for at least one respective supply line of the one or more supply lines, the plurality of receiving passages extending in the longitudinal direction, at least one support chain, comprising a plurality of chain links, that cooperates with the enclosure for support of at least one associated receiving passage in the straight position, wherein each two successive chain links of the plurality of chain links are pivotably connected together, wherein the support chain forms a support surface, a width of which is greater than a corresponding dimension of a free cross-section of the at least one associated receiving passage;

wherein the support chain has first abutment surfaces which bear against each other in the straight position and limit a pivotable movement of the respective successive chain links in a first direction, and second abutment surfaces which bear against each other in the direction-changing position and limit the pivotable movement in a direction opposite to the first direction, wherein the first abutment surfaces and the second abutment surfaces are respectively of a dimension in the longitudinal direction and a dimension in a width direction parallel to a direction-changing axis, and wherein the dimension of the respective abutment surface in the width direction is greater than the dimension of the respective abutment surface in the longitudinal direction.

2. The line guide arrangement according to claim 1, wherein the width of the support surface is greater than a total of the corresponding dimensions of the cross-sections perpendicularly to the longitudinal direction of at least two associated receiving passages.

3. The line guide arrangement according to claim 1, wherein the plurality of chain links further comprises individual, structurally identical, chain links.

4. The line guide arrangement according to claim 1, wherein each chain link of the plurality of clain links is one piece body.

5. The line guide arrangement according to claim 4, wherein the one piece body is monolithic and formed of plastic.

6. The line guide arrangement according to claim 1, wherein each chain link of the plurality of chain links has a plate-shaped configuration.

7. The line guide arrangement according to claim 1, wherein each chain link of the plurality of chain links has a dimension in a width direction which is greater at least by a factor ≥5 than a dimension in a height direction perpendicularly to the width direction and perpendicularly to the longitudinal direction.

8. The line guide arrangement according to 1, wherein, in the straight position, a surface region of a chain link, that is opposite the second abutment surfaces, is flush with a surface of a next adjacent chain link and wherein, in the direction-changing position, a further surface region of the chain link, that is opposite the first abutment surfaces, is flush with the surface of the next adjacent chain link.

9. The line guide arrangement according to claim 1, wherein the width of the support surface is greater than a chain pitch of the support chain.

10. The line guide arrangement according to claim 1, wherein the plurality of chain links are pivotably connected together by receiving means-pin connections.

11. The line guide arrangement according to claim 10, wherein the receiving means-pin connections have inclined insertion portions at pins and insertion grooves at receiving means.

12. The line guide arrangement according to claim 1, wherein each chain link of the plurality of chain links has a dimension in a width direction greater than a dimension in the longitudinal direction.

13. The line guide arrangement according to claim 1, wherein the support chain is enclosed with a flexible chain enclosure.

14. The line guide arrangement according to claim 1, wherein the enclosure is of a belt-like configuration having narrow sides and at least at one of the narrow sides has at least one functional region extended in the longitudinal direction for dust-tight closure of an opened state of the enclosure in which the one or more supply lines is insertable or removable transversely to the longitudinal direction and for transfer of the enclosure into the opened state.

15. The line guide arrangement according to claim 14, wherein the functional region includes two cooperating closure profiles of a closure, wherein the closure profiles are positively locking and/or force-locking engagement profiles.

16. The line guide arrangement according to claim 14, wherein the functional region has a fixing profile for connecting the enclosure to a further enclosure.

17. The line guide arrangement according to claim 1, wherein the enclosure is formed of plastic.

18. The line guide arrangement according to claim 1, wherein the support chain has a plurality of chain links which each have convex guide surfaces and with opposite end faces form a minimal movement gap.

19. A support chain, wherein the support chain is receipro-catingly displaceable with a formation of two runs and a direction-changing arc between the two runs, wherein the support chain within the two runs is in a straight position with respect to a longitudinal direction and extends in a direction-changing position within the direction-changing arc, wherein, in the direction-changing position, the support chain is curved about a direction-changing axis, wherein the support chain comprises a plurality of chain links, wherein each two successive chain links of the plurality of chain links are pivotably connected together, wherein a width of a support surface of the support chain is at least three times a spacing of the support surface relative to an opposite side of the support chain, wherein the support chain has first abutment surfaces which bear against each other in the straight position and limit a pivotable movement of the respective successive chain links in a first direction, and second abutment surfaces which bear against each other in the direction-changing position and limit the pivotable movement in a direction opposite to the first direction, wherein the first abutment surfaces and the second abutment surfaces are respectively of a dimension in the longitudinal direction and a dimension in a width direction parallel to the direction-changing axis, and wherein the dimension of the respective abutment surface in the width direction is greater than the dimension of the respective abutment surface in the longitudinal direction.

* * * * *